United States Patent [19]

Bhagwat

[11] Patent Number: 4,482,946
[45] Date of Patent: Nov. 13, 1984

[54] HYBRID INVERTER

[75] Inventor: Pradeep M. Bhagwat, Baltimore, Md.

[73] Assignee: Canadian Patents and Development Limited, Ottawa, Canada

[21] Appl. No.: 424,759

[22] Filed: Sep. 27, 1982

[51] Int. Cl.³ .......................................... H02M 7/515
[52] U.S. Cl. .................................................. 363/136
[58] Field of Search ............... 363/135, 136, 137, 138, 363/120, 121

[56] References Cited

U.S. PATENT DOCUMENTS

| | | | |
|---|---|---|---|
| 3,207,974 | 9/1965 | McMurray | 307/305 |
| 4,308,578 | 12/1981 | Tamura et al. | 363/138 |
| 4,309,750 | 1/1982 | Sugimoto | 363/138 |
| 4,405,977 | 9/1983 | Bhagwat et al. | 363/138 |

Primary Examiner—William M. Shoop
Assistant Examiner—Jeffrey Sterrett
Attorney, Agent, or Firm—Edward Rymek

[57] ABSTRACT

The hybrid inverter consists of thyristor switches with their related commutation circuit, paralleled by transistor switches. When the current magnitude is below a predetermined level, it is conducted by the transistor switches and when above the predetermined level, it is conducted by the thyristor switches. The commutation circuit includes a capacitor which need not be precharged to initiate commutation. Thus, the commutation circuit works only when a thyristor is conducting current thereby substantially reducing the number of commutations in an output cycle.

11 Claims, 8 Drawing Figures

HYBRID INVERTER

BACKGROUND OF THE INVENTION

This invention is directed to inverter circuits and, in particular, to thyristor-transistor hybrid inverters.

With the present interest in the use of variable frequency induction motors, state of the art inverters, whether they are thyristor or transistor based, are attracting attention. The thyristor inverter described in U.S. Pat. No. 3,207,974, which issued on Sept. 21, 1965, to W. McMurray, remains one of the most preferred, particularly in its modified form wherein a pair of diodes are connected across the commutation thyristors with a damping resistor connected between the juncture of the pair of diodes and the juncture of the commutation thyristors. This inverter is advantageous since it has a high efficiency, its commutation circuit components are small and it is suitable for pulse width modulation (PWM) operation. On the other hand, it has been found that this inverter has a propensity for misfirings and shoot-throughs and that protection against commutation failure or short circuit is difficult.

A further thyristor inverter is described in U.S. Pat. No. 4,344,123, which issued on Aug. 10, 1982, to P. Bhagwat and V. R. Stefanovic. It describes an efficient multilevel PWM inverter that utilizes a versatile commutation circuit. The commutation circuit is described in Canadian patent application No. 363,141 filed on Sept. 25, 1980, which corresponds to U.S. patent application Ser. No. 296,296, filed on Aug. 26, 1981, now U.S. Pat. No. 4,405,977 naming P. Bhagwat and V. R. Stefanovic as inventors. This commutation circuit has the unique feature of having zero charge on the commutation capacitor before and after a commutation, which offers tremendous flexibility in programming or in bypassing the commutations.

When the commutation circuits are designed for thyristor inverter motor drive applications, some safety margin must be allowed to successfully commutate an overload or fault current. Usually, commutation circuits are designed to commutate at least twice the full load current. In order to optimize the commutation circuit for minimum capacitance, the peak commutation circuit current will be $I_{pk}=1.5I$, where I is the current to be commutated. As an example, for a motor with a peak full load current of 100 A, $I_{pk}=1.5(2\times 100)=300$ A. The inverter should be able to take a step command from no load to full load and, therefore, regardless of the actual current to be commutated, a commutation circuit should always deliver an impulse current with the peak magnitude of $I_{pk}$. In order to calculate the losses, both actual current which is commutated and the peak commutation circuit current are important.

Losses in a PWM thyristor inverter can be divided into fixed losses and variable losses. The fixed losses, which depend on the supply voltage rather than the actual value of the load current, consist of:

(a) $I^2R$ losses in the commutation inductor and capacitor, and any other inductor in the path of the commutation current, (b) switching losses in the auxiliary SCR, and (c) losses in the snubber circuit across the auxiliary and main SCR. The losses which vary according to the load consist of:

(a) losses in the di/dt inductor due to load current, (b) in the feedback diode during commutation and free wheeling period, (c) losses in the main SCR, and (d) trapped energy losses in the commutation and di/dt inductor. Since the fixed losses are high in a thyristor inverter irrespective of the actual current conduction of the switches, it is obvious that the efficiency of a thyristor inverter will be degraded when switching at low power levels. In PWM inverters operating at low frequencies, a majority of the commutations take place to commutate small magnitude currents resulting in a system which is inefficient.

Power transistor inverters have been designed particularly with the development of high power transistors, as small and medium power motor drives. However, these inverters do not satisfy the needs of high power applications.

SUMMARY OF THE INVENTION

It is therefore an object of this invention to provide an efficient hybrid inverter particularly useful for high power applications.

These and other objects are achieved in a hybrid inverter having both thyristors and power transistors. The inverter may be single or multiphase. Each leg of the inverter has a pair of thyristor switches connected in series across a dc source, a commutation circuit for turning off the thyristors in the thyristor switches, and a transistor switch connected across each of the thyristor switches. The thyristor switches conduct current to the load during preselected periods and the transistor switches conduct current during other preselected periods. The thyristor switches would always conduct the load currents that are above a predetermined level, while the transistor switches would normally conduct the load currents that are below the predetermined level.

The commutation circuit of an efficient inverter includes a pair of series-connected commutation thyristors connected in parallel with the pair of thyristor switches and a diode connected in reverse polarity across each of the thyristor switches and each of the commutation thyristors. The commutation circuit further includes a commutation capacitor connected between the juncture between the thyristor switches and a juncture between the commutation thyristors. Commutation inductance is also in a series circuit with the capacitor and dc source and may be located adjacent the capacitor between the junctures.

In accordance with another aspect of the commutation circuit, a discharge circuit may be connected across the commutation capacitor to assure its complete discharge after each commutation. The discharge circuit may be an ac switch or a series circuit consisting of a resistance and a large inductance.

Each thyristor switch may include a number of parallel controllable thyristors and each transistor switch may include a number of parallel power transistors, such as MOSFETs.

Many other objects and aspects of the invention will be clear from the detailed description of the drawings.

DETAILED DESCRIPTION

Figure 1:
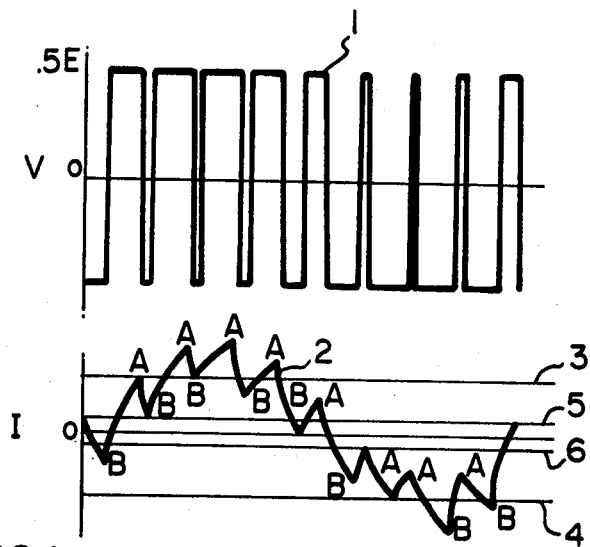
FIG. 1 illustrates a typical PWM voltage and current waveform.

FIG. 1 shows a typical PWM voltage 1 and current 2 waveform for a motor. In a thyristor inverter, at every instant A, current is transferred from a main SCR to a feedback diode at the complementary voltage reference. As the main SCR is conducting just before every instant A, it is necessary to call for a force commutation to turn off the SCR. At every instant B, current is transferred from the free wheeling diode to the main SCR. Though the main SCR does not conduct before every instant B, in most commutation circuits it is necessary to call for a commutation to reverse the polarity of the charge on the commutation capacitor so that it will be appropriate for the next commutation at instant A. In the commutation circuits described in the above referenced Canadian and U.S. applications, the commutations at instants B are not necessary since the commutation capacitor begins and ends each A instant commutation cycle with a zero charge.

It is important to note, however, that during all of the instant A commutations, full utilization of the commutation capability of any one of the commutation circuits never takes place. Even at the full load current, only fifty percent of the commutation capability is utilized because the commutation circuit is designed to commutate at least twice the full load current. At all instants B, there is no current actually commutated and the ratio, energy lost in commutation/actual energy used for commutation, becomes infinite. When the motor is operating at low speeds, the commutation circuit utilization is very poor if the load is much less than the rated full load. This is so, because at low speeds, the number of commutations per cycle substantially increases in order to minimize the harmonic content in the motor current and therefore, the number of redundant and low current commutations increases.

Figure 2:
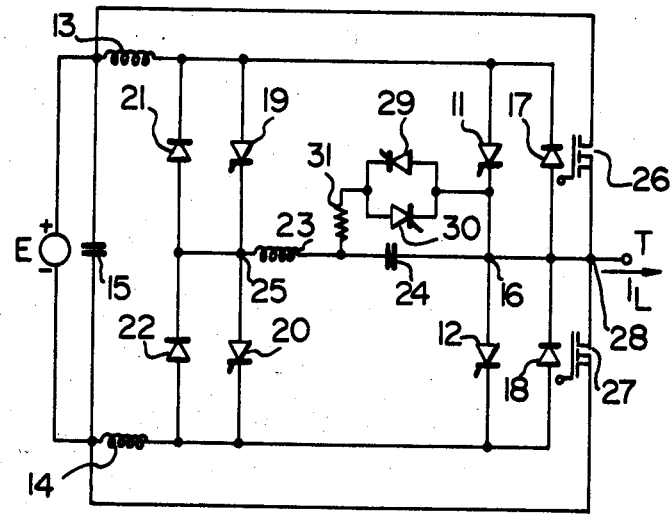
FIG. 2 illustrates one leg of the hybrid inverter in accordance with the present invention.

One leg of a multiphase inverter, in accordance with the present invention, is illustrated in FIG. 2. The inverter leg includes a pair of thyristors 11 and 12 connected to a voltage source E through a pair of inductors 13 and 14. Inductors 13 and 14 are di/dt inductors. Capacitor 15 across the source E is a filter capacitor which responds to instant current demands to the load. The load is connected to terminal T at the juncture 16 between the thyristors 11 and 12, which apply power of opposite polarity to the load resulting in an alternating current of desired frequency through the load.

The commutation circuit for thyristors 11 and 12 includes commutating diodes 17 and 18 connected in reverse polarity across the thyristors 11 and 12. Auxiliary thyristors 19 and 20, each with a diode 21, 22, connected across it in reverse polarity, are connected to the source E through the inductors 13 and 14. The commutation circuit further includes series connected commutation inductor 23 and commutation capacitor 24 connected between juncture 16 and juncture 25 between thyristors 19 and 20.

In operation, conducting thyristor 11 is commutated by triggering thyristor 20 which causes an oscillating current in the path: thyristor 11, capacitor 24, inductor 23 and thyristor 20, and which turns thyristor 11 off as described in the above referenced applications. Conducting thyristor 12 is commutated by triggering thyristor 19, which produces an oscillating current in the path: thryistor 19, inductor 23, capacitor 23 and thyristor 12. It is to be noted that since the voltage on capacitor 23 is always zero when commutation is initiated, thyristors 11 and 12 may alternately be triggered and commutated for simple inverter operation, or each thyristor 11 or 12 may be triggered and commutated a number of times in sequence for pulse width modulated inverter operation. The need for resetting or recharging the commutation circuit is not required.

Each inverter leg, in accordance with the present invention, further includes a pair of transistor switches 26, 27, across the voltage source E in parallel of the main inverter thyristors 11 and 12. The juncture 28 between the transistors is connected to juncture 16 and load terminal T. Each transistor switch 26, 27, may be a single transistor or a group of several transistors connected in parallel to handle the necessary current. Depending upon the full load current and the rating of the available transistors, the switches may be designed to handle up to fifty percent of the full load current.

The new high current, high voltage MOSFET offers several advantages over more conventional bipolar transistors. The MOSFET is characterized by a very high gain, a rugged safe operating area and a positive temperature coefficient, which all contribute to an ease in paralleling. Its gain does not increase with increasing current, it is, therefore, capable of handling high peak current without showing the tendency to pull out of saturation. Because of its high gain, typically in the order of $10^9$, it can be driven by a simple driver when used for motor control applications. Though the MOSFET has a very high switching speed, it is not very critical for the motor control applications. The design Procedure to parallel MOSFETs for a 200A switch is explained in the "Hexfet Data Book", first edition, International Rectifier, 1981, which is hereby incorporated by reference. The dynamics of current sharing in parallel MOSFETs is explained in the publication, "Techniques for Controlling Dynamic Current Balance in Parallel Power MOSFET Configurations", by J. Forsythe, Conference Record, 1981 Powercon, which is incorporated herein by reference.

The requirement of a large base drive is major problem in bipolar transistor switches. This makes it less attractive for medium size inverters. However, for hybrid inverters, bipolar transistor switches may be used. In the hybrid inverter, current is transferred to the thyristor when the allowable peak current in the transistor is reached. This helps to ease the base drive design as the transistor is never subjected to high peak currents during faults or overload, etc., and the problem of pulling out of saturation at high current does not occur.

The hybrid inverter may further include a discharge circuit consisting of an ac switch, such as a triac or a pair of reverse polarity connected thyristors 29, 30, or transistors, in series with a resistor 31. The discharge circuit is connected across commutation capacitor 24. The discharge circuit may be initiated after each commutation cycle to discharge any residual charge on capacitor 24, particularly when the same thyristor 11 or 12 is being commutated several times in succession.

Figure 3:
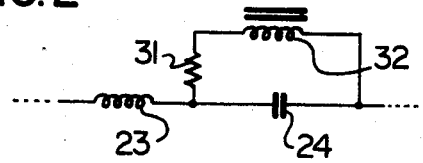
FIG. 3 illustrates an alternate embodiment of the commutation capacitor discharge circuit.

In the discharge circuit, the ac switch, i.e. thyristors 29 and 30, may be replaced by a saturable inductor 32, as illustrated in FIG. 3. The inductor 32 is made large enough relative to the commutation inductor 23, such that current flow through the resistor 31-inductor 32 path is delayed until after the commutation cycle.

Figure 4:
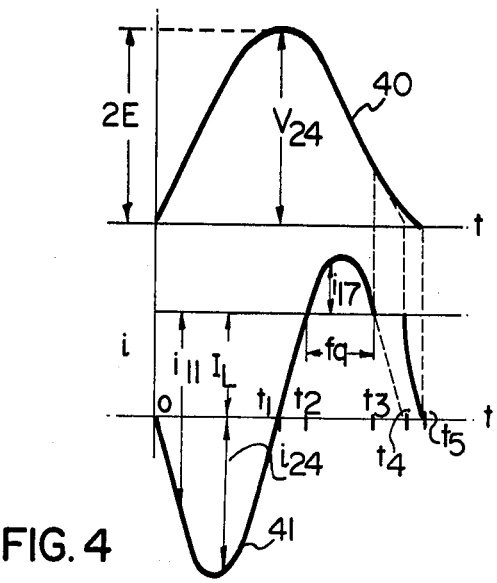
FIG. 4 illustrates the voltage and current waveform of the commutation capacitor during the commutation cycle.

In the hybrid inverter, shown in FIG. 2, the commutation circuit need operate only when thyristors 11 and 12 are to be turned off. The commutation cycle will be described with reference to FIG. 4, which illustrates the voltage waveform 40 and the current waveform 41 of commutation capacitor 24 during the commutation cycle. Thyristors 11 and 12, which when conducting, supply current to a predominantly inductive load (motor). To turn thyristor 11 off, thyristor 20 is triggered at time $t_o$, and to turn thyristor 12 off, thyristor 19 is triggered. At time $t_o$, commutation capacitor 24 is not charged.

The commutation cycle is described for thyristor 11. When thyristor 20 is triggered, an oscillating current is produced from the source E, through inductor 13, thyristor 11, capacitor 24, inductor 23, thyristor 20, inductor 14 and back to the source E. After reaching its peak, the current decreases and reverses at $t=t_1$. Increase in current from the capacitor 24 decreases the current in thyristor 11, and at $t=t_2$, load current is transferred from thyristor 11 to the capacitor 24. During the interval $t_2-t_3$, the excess of the capacitor 24 current flows from capacitor 24 through diode 17, inductor 13, dc source E, inductor 14, diode 22 and inductor 23, back to capacitor 24. During the period $t_2-t_3$, the thyristor 11 commutates. From $t=t_3$ to $t=t_5$, capacitor 24 discharges linearly at a constant current and at $t=t_5$, discharge thyristors 29 and 30 are triggered to ensure complete discharge of the capacitor 24. Diode 22 conducts during the interval $t=t_1$ to $t=t_5$, during which thyristor 20 is commutated. At $t=t_5$, capacitor 24 current falls below the load current and the latter is divered to the feedback diode 18.

In order to effectively control the commutation requirements of a hybrid inverter, logic circuits are provided which will generate pulses to coincide with load voltage polarity changes. However, since a commutation is not required with every polarity change, some of these pulses are made to bypass the auxiliary thyristors 19 and 20, depending upon the direction of the current flow at terminal T. The current can be flowing: (a) from terminal T to the load, or, (b) from the load to terminal T. Under circumstance (a), either thyristor 11 or transistor switch 26 is conducting or diode 18 is conducting. A redundant commutation situation will definitely occur when the load is being switched from the negative to the positive terminal of the dc source E. Under circumstance (b), either thyristor 12 or transistor switch 27 is conducting, or diode 17 is conducting. A redundant commutation situation will occur when the load is being switched from the positive to the negative terminal of the dc source E. To bypass redundant commutations, pulses should, therefore, always be blocked from thyristor 19 when the load current is positive and from thyristor 20 when the load current is negative.

Referring back to FIG. 1, and the current waveform 2, a positive boundary level 3 and a negative boundary level 4 are denoted. These are the current levels at which the current capacity of the transistor switches 26 and 27 are exceeded and the currents must be transferred to the thyristors 11 and 12. When the load current increases to the boundary level 3 or 4, transistor switch 26 or 27 is switched off and thyristor 11 or 12 is triggered at the same time. Once the thyristor is triggered, current will not be transferred back to the transistor until the thyristor SCR is commutated. This is very useful for the circuit operation because it eliminates hysteresis and noise problems at the boundary of current transfer. Thus, in a hybrid inverter leg, the following circumstances can occur when current flow to the load is positive or negative, and the load is connected to the positive or negative terminals, respectively, of the source E:

(a) only the thyristor 11 or 12 is allowed to conduct when the current exceeds the respective boundary level 3 or 4 of current transfer, or
(b) either thyristor 11 or 12, or transistor switch 26 or 27 can be allowed to conduct when the current is between the boundary levels 3 and 4 of current transfer.

To switch the load from one voltage source terminal to the other, the appropriate thyristor 20 or 19 must be triggered. However, at the time of switching, as pulses are removed from the conducting thyristor 11 or 12, or transistor switch 26 or 27, the commutation cycle will not be initiated if it is the transistor switch 26 or 27 that is conducting, but the commutation cycle will be initiated if it is one of the thyristors 11 or 12 that is conducting.

Another important aspect which must be taken into consideration is sensing the near zero values of load current. It becomes very difficult to sense very low magnitudes of load current and improper detection of the load current polarity may end up in simultaneous triggering of the main SCRs, which will result in a shoot through. This problem, which is created when the load current falls within a "deadband" between levels 5 and 6 in FIG. 1, is avoided by not blocking the commutation cycle under any circumstance when the current is in the "deadband". However, in the hybrid inverter, if the load current never crosses the boundaries 3 or 4 of current transfer from the transistor switches to the thyristors, only transistors or diodes can conduct, and commutations will not occur in the "deadband".

In one implementation of a single phase hydrid inverter for supplying an R-L load with a maximum load current of 120 A operating from a dc source of 220 volts, the transistor switches consisted of two MOSFETs connected in parallel to handle a peak load current of 30 A. Quad voltage comparators "LM 124" were used to produce the commutation pulses in conjunction with a current transformer for detecting the load current which was compared to four reference levels, two for the "deadband", and two for the boundary levels of current transfer. The inverter was subjected to a PWM waveform.

Figure 5:
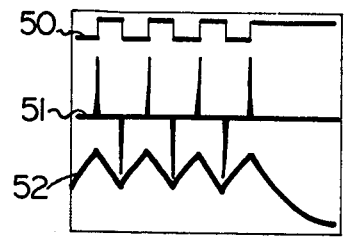
FIGS. 5, 6 and 7 illustrate the hybrid inverter's thyristor gating signals, commutation capacitor voltages and load currents under different conditions.

FIG. 5 shows a representative trace 50 of the thyristor 11 gating voltage, a representative trace 51 of the capacitor 24 voltage and a representative trace 52 of the load current. As seen from trace 51, a commutation cycle was allowed to occur at each voltage switching time, with all of the negative pulses being redundant commutations.

Figure 6:
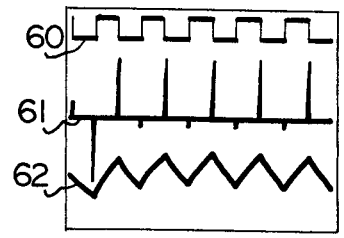

FIG. 6 shows a representative trace 60 of the thyristor 11 gating voltage, a representative trace 61 of the capacitor 24 voltage and a representative trace 62 of the load current. In this case, the redundant commutations were suppressed. The positive pulses of the commutation capacitor 24 voltage occurred because all the positive commutations took place when current exceeded the boundary level 3 of current transfer. One negative commutation pulse occurred when load current was in the "deadband" between levels 5 and 6.

Figure 7:
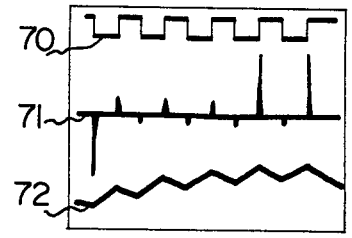

FIG. 7 shows a representative trace 70 of the thyristor 11 gating voltage, a representative trace 71 of the capacitor 24 voltage, and a representing trace 72 of the load current. Only one negative and two positive commutations occurred. The negative commutation occurred when the load current appeared in the "deadband" between levels 5 and 6, and the positive commutations occurred when the load current crossed the boundary level 3. During the remaining time, the transistor switch 26 was conducting the current to the load.

Though a single commutation inductor 23 is shown in FIG. 2 for each leg of the inverter, it is understood that, as discussed in the above referenced applications, the commutation inductance may be divided into a number of inductors properly placed in the circuit.

Figure 8:
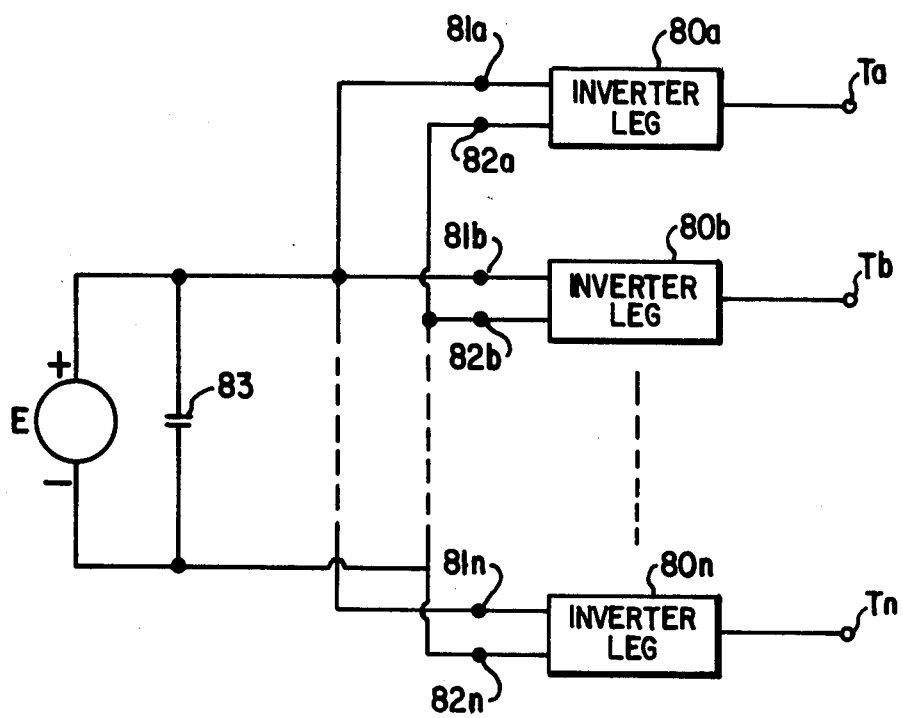
FIG. 8 illustrates a multiphase inverter in accordance with the present invention.

FIG. 8 illustrates a multiphase inverter in accordance with the present invention. The inverter includes a number of legs 80a, 80b, ... 80n, of the type described with respect to FIG. 2. Each leg is connected by respective terminal pairs 81a-82a, 81b-82b, ... 81n-82n, to a voltage source E across which is connected a filter capacitor 83. The load is connected to the terminals Ta, Tb, ... Tn, respectively, of the legs.

Many modifications in the above described embodiments of the invention can be carried out without departing from the scope thereof, and, therefore, the scope of the present invention is intended to be limited only by the appended claims.

I claim:

1. A hybrid inverter having at least one leg to provide at least a single phase output, each inverter leg comprising:
    a pair of thyristor means connected in series across a dc source with a juncture between the thyristors for connection to a load, to control current flow to the load during preselected periods;
    thyristor commutation means for commutating thyristors in either of the thyristor means; and
    transistor means connected across each of the thyristor means to control current flow to the load during other preselected periods.

2. A hybrid inverter as claimed in claim 1 wherein the commutation means includes a pair of series connected commutation thyristors connected in parallel with the pair of thyristor means; a diode connected in reverse polarity across each of the thyristor means and each of the commutation thyristors; and series connected commutation capacitance means and commutation inductance means connecting the juncture between the thyristor means and a juncture between the commutation thyristor.

3. A hydrid inverter as claimed in claim 1 wherein the commutation means includes a pair of series connected commutation thyristors connected in parallel with the pair of thyristor means; a diode connected in reverse polarity across each of the thyristor means and each of the commutation thyristors; commutation capacitance means connecting the juncture between the thyristor means and a juncture between the commutation thyristor; and commutation inductance means connected in the inverter circuit to be in series with the dc source and the commutation capacitance means.

4. A hybrid inverter as claimed in claim 2 or 3 which further includes a discharge circuit connected across the capacitance means, the discharge circuit consisting of a controllable ac switch means.

5. A hybrid inverter as claimed in claim 2 or 3 which further includes a discharge circuit connected across the capacitance means, the discharge circuit consisting of a series resistor-inductor circuit.

6. A hybrid inverter as claimed in claim 1, 2 or 3 wherein each thyristor means consists of at least one controllable thyristor.

7. A hybrid inverter as claimed in claim 1, 2 or 3 wherein each transistor means consists of one or more parallel connected power transistors.

8. A hybrid inverter as claimed in claim 1, 2 or 3 wherein each transistor means consists of one or more parallel connected MOSFETs.

9. A hybrid PWM inverter having a number of legs to provide a multiphase output, each inverter leg comprising:
    a pair of thyristor means connected in series across a dc source with a juncture between the thyristors for connection to a load, to control current flow to the load during preselected periods;
    thyristor commutation means for commutating thyristors in either of the thyristor means; and
    transistor means connected across each of the thyristor means to control current flow to the load during other preselected periods, the magnitude of the current controlled by the transistor means being below a predetermined level, and the magnitude of the current controlled by the thyristor means being above the predetermined level.

10. A hybrid PWM inverter as claimed in claim 9 wherein the commutation means includes a pair of series connected commutation thyristors connected in parallel with the pair of thyristor means; a diode connected in reverse polarity across each of the thyristor means and each of the commutation thyristors, and series connected commutation capacitance means and commutation inductance means connecting the juncture between the thyristor means and a juncture between the commutation thyristors.

11. A hybrid PWM inverter as claimed in claim 9 wherein the commutation means includes a pair of series connected commutation thyristors connected in parallel with the pair of thyristor means; a diode connected in reverse polarity across each of the thyristor means and each of the commutation thyristors, commutation capacitance means connecting the juncture between the thyristor means and a juncture between the commutation thyristors, and commutation inductance means connected in the inverter circuit to be in series with the dc source and the commutation capacitance means.

* * * * *